US008521753B2

(12) United States Patent (10) Patent No.: US 8,521,753 B2
Burukhin et al. (45) Date of Patent: Aug. 27, 2013

(54) UNIFIED FORMATS FOR RESOURCES AND REPOSITORIES FOR MANAGING LOCALIZATION

(75) Inventors: Anatoliy Burukhin, Issaquah, WA (US); Ayman Aldahleh, Redmond, WA (US); Javier L. Larrinaga, Redmond, WA (US); John Whelan, Co. Wicklow (IE); David Ahs, Dublin (IE); Robert Redlich, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 843 days.

(21) Appl. No.: 12/041,641

(22) Filed: Mar. 3, 2008

(65) Prior Publication Data

US 2009/0222479 A1  Sep. 3, 2009

(51) Int. Cl.
*G06F 7/00* (2006.01)
*G06F 17/30* (2006.01)

(52) U.S. Cl.
USPC ........................................................ 707/756

(58) Field of Classification Search
USPC ............................................ 707/999.103, 756
See application file for complete search history.

(56) References Cited

U.S. PATENT DOCUMENTS

| 6,636,845 B2 * | 10/2003 | Chau et al. ............................ 1/1 |
| 7,103,875 B1 | 9/2006 | Kaneko et al. |
| 2005/0066315 A1 | 3/2005 | Nguyen et al. |
| 2006/0150173 A1 | 7/2006 | McHugh et al. |
| 2006/0195831 A1 | 8/2006 | Bossom et al. |
| 2006/0206877 A1 | 9/2006 | Kohlmeier et al. |
| 2006/0287844 A1 | 12/2006 | Rich |
| 2007/0061345 A1 | 3/2007 | Thompson et al. |
| 2007/0143321 A1 * | 6/2007 | Meliksetian et al. ......... 707/101 |
| 2007/0169010 A1 | 7/2007 | Garner et al. |
| 2007/0208997 A1 | 9/2007 | Jiang et al. |

OTHER PUBLICATIONS

"Resources in .Resx File Format", 2007, Microsoft Corporation, pp. 3.
Davis et al., "Creating Global Software: Text Handling and Localization in Taligent's CommonPoint Application System. (Taligent Inc.)", IBM Systems Journal, Jun. 1, 1996, pp. 17.
"Universal Editor for Efficient Translation", downloaded Oct. 11, 2007 from ftp://ftp.across.nel/white_papers/wp_edit_en.pdf, 4 pages.

* cited by examiner

*Primary Examiner* — Alexey Shmatov
(74) *Attorney, Agent, or Firm* — Hope Baldauff, LLC

(57) ABSTRACT

Tools and techniques for unified formats for resources and repositories for managing localization are described herein. The unified resource repositories may include representations of any number of resources, the resources representing textual information that is displayable in user interface presented by software applications. The representations of the resources may include respective data tags that are associated with name attributes identifying the resources, value tags providing values of the resources. Meta tags provide recursive nesting mechanisms for associating the name attribute and the value tag with additional instances of name attributes and value tags.

20 Claims, 5 Drawing Sheets

Application Serial No.: 12/041,641
Attorney Docket No.: 321965.01
REPLACEMENT SHEET

UNIFIED FORMATS FOR RESOURCES AND REPOSITORIES FOR MANAGING LOCALIZATION

BACKGROUND

Software products and applications typically incorporate a variety of different textual labels and other types of string data, referred to herein generally as resources. Typically, these resources are stored and maintained in a variety of disparate formats.

These resources may be localized so that the software products and applications may be marketed globally to human users who may speak a variety of different languages. However, if these resources to be localized are stored and maintained in a variety of different formats, these multiple formats may complicate the localization process.

SUMMARY

Tools and techniques for unified formats for resources and repositories for managing localization are described herein. The unified resource repositories may include representations of any number of resources, the resources representing textual information that is displayable in user interface presented by software applications. The representations of the resources may include respective data tags that are associated with name attributes identifying the resources, value tags providing values of the resources. Meta tags provide recursive nesting mechanisms for associating the name attribute and the value tag with additional instances of name attributes and value tags.

The above-described subject matter may also be implemented as a method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
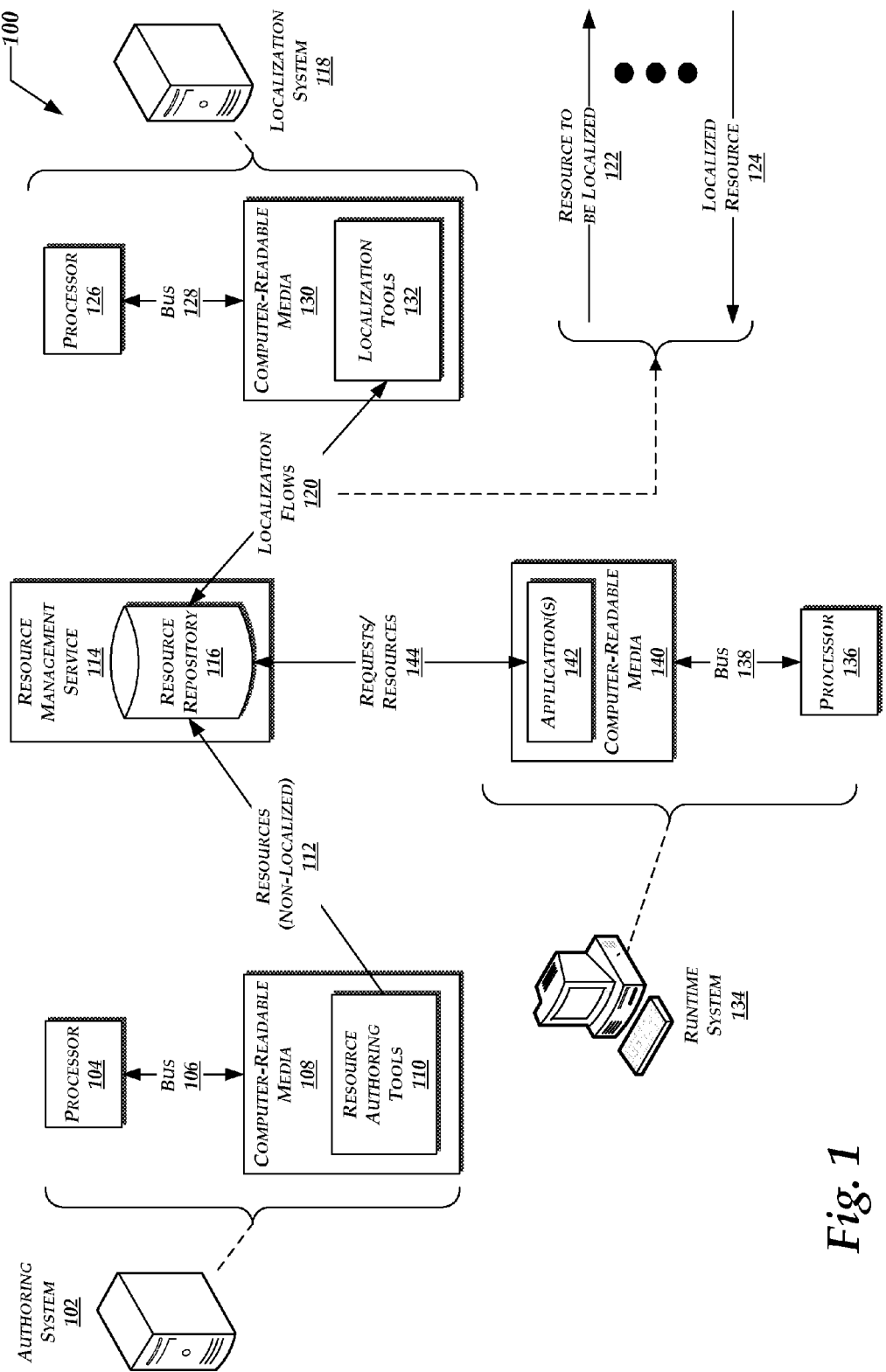
FIG. 1 is a combined block and flow diagram illustrating systems or operating environments in which unified formats for resources and repositories for managing localization may operate.

The following detailed description is directed to technologies for unified formats for resources and repositories for managing localization. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of tools and techniques for repositories and related services for managing localization will be described.

FIG. 1 illustrates systems or operating environments, denoted generally at 100, in which unified formats for resources and repositories for managing localization may operate. These systems 100 may include one or more authoring systems 102, with FIG. 1 illustrating one authoring system 102 only for clarity of illustration. However, implementations of the description herein may include any number of authoring systems.

Turning to the authoring systems 102 in more detail, these systems may include one or more processors 104, which may have a particular type or architecture, chosen as appropriate for particular implementations. The processors 104 may couple to one or more bus systems 106 chosen for compatibility with the processors 104.

The systems 102 may also include one or more instances of computer-readable storage media 108, which couple to the bus systems 106. The bus systems may enable the processors 104 to read code and/or data to/from the computer-readable storage media 108. The media 108 may represent storage elements implemented using any suitable technology, including but not limited to semiconductors, magnetic materials, optics, or the like. The media 108 may include memory components, whether classified as RAM, ROM, flash, or other types, and may also represent hard disk drives.

The storage media 108 may include one or more modules of software instructions that, when loaded into the processor 104 and executed, cause the systems 102 to perform various techniques related to providing and managing unified formats for resource repositories and related services for managing localization. As detailed throughout this description, the authoring systems 102 may manage the creation of resources using the components and flows described herein.

The computer-readable media 108 may include one or more instances of resource authoring tools 110. These resource authoring tools may include resource editors that enable developers, programmers, or other personnel to create or modify resources 112 to be used in one or more applications or other software products. These applications may incorporate or operate with various textual information, strings, or other label-type elements, referred to generally in this description as resources. Examples of these resources may include, but are not limited to, labels or strings appearing in various user interface (UI) elements, dialog boxes, error messages, or the like. The content of these resources may determine, for example, the content of error messages that are presented to users when the applications are running.

The resources as shown at 112 are labeled as non-localized, in the sense that developers may author these resources initially in one of one or more human languages. Afterwards, the tools and techniques described herein may localize, or translate, these resources into one or more target human languages. For example only, some developers may author the resources 112 primarily in one language (e.g., English), while other developers may author the resources primarily in another language (e.g., Japanese). The examples of languages as chosen herein are provided only for example, and do not limit possible implementations. In general, the operating environments 100 may support any number of developers offering resources in any number of languages.

As non-localized resources 112 become available, a resource management service 114 may store these resources into a repository 116. In turn, the resource management service may send these resources to one or more localization systems 118. In general, these localization systems may participate in localization flows 120 with the resource management service 114. These localization flows 120 may include representations 122 of the non-localized resources to be localized, as well as localized versions 124 of the non-localized resources.

FIG. 1 provides one example of a localization system 118 for clarity of illustration only. However, implementations of the operating environments 100 may include any number of localization systems, as appropriate to localize resources into any number of human languages. In some scenarios, different localization systems may be assigned to localize into corresponding languages. In other scenarios, a given localization system may localize into multiple target languages.

Turning to the localization systems 118 in more detail, these systems may include one or more processors 126, which may have a particular type or architecture, chosen as appropriate for particular implementations. The processors 126 may couple to one or more bus systems 128 chosen for compatibility with the processors 126. The processors 126 and bus systems 128 may or may not be of the same type or architecture as the processor 104 and the bus systems 106 as provided in the authoring systems 102.

The localization systems 118 may also include one or more instances of computer-readable storage media 130, which couple to the bus systems 128. The bus systems may enable the processors 126 to read code and/or data to/from the computer-readable storage media 130. The media 130 may represent storage elements implemented using any suitable technology, including but not limited to semiconductors, magnetic materials, optics, or the like. The media 130 may include memory components, whether classified as RAM, ROM, flash, or other types, and may also represent hard disk drives.

The storage media 130 may include one or more modules of software instructions that, when loaded into the processor 126 and executed, cause the localization systems 118 to perform various techniques related to providing and managing unified formats for resource repositories and related services for managing localization. As detailed throughout this description, these localization systems 118 may localize resources using the components and flows as described herein.

The computer-readable media 130 may include one or more instances of localization tools 132. These localization tools may enable localizers (whether automated processes and/or live personnel) to translate the resources 122 into the localized resources 124. More specifically, the localized resources 124 may be returned for storage in the resource repository, to be used in one or more applications or other software products that are being built for particular human-language markets. As described in further detail below, the resource repository may associate non-localized resources with corresponding, localized versions of these resources. In addition, the resource repository may store these resources using a unified format across a variety of different applications.

The resource management service 114 may provide resources upon request to one or more run-time systems 134. Turning to the runtime systems 134 in more detail, these systems may include one or more processors 136, which may have a particular type or architecture, chosen as appropriate for particular implementations. The processors 136 may couple to one or more bus systems 138 chosen for compatibility with the processors 136. The processors 136 may or may not be of the same type or architecture as the processors 126 and 104 discussed previously. Similarly, the bus systems 138 may or may not be of the same type or architecture as the bus systems 128 and 106 described above.

The runtime systems 134 may also include one or more instances of computer-readable storage media 140, which couple to the bus systems 138. The bus systems may enable the processors 136 to read code and/or data to/from the computer-readable storage media 140. The media 140 may represent storage elements implemented using any suitable technology, including but not limited to semiconductors, magnetic materials, optics, or the like. The media 140 may include memory components, whether classified as RAM, ROM, flash, or other types, and may also represent hard disk drives.

The storage media 140 may include one or more modules of software instructions that, when loaded into the processor 136 and executed, cause the runtime systems 134 to perform various techniques related to utilizing unified formats for resource repositories and related services for managing localization. The computer-readable media 140 may include one or more instances of software products or applications 142 that incorporate particular resources. Components within the applications 142 may request particular resources, based on unique identifiers associated with the resources. FIG. 1 denotes these requests and related resources at 144. The resource management service 114 may cooperate with the resource repository 116 to service resource requests from any number of runtime systems 134.

In some scenarios, the resources 144 may be non-localized, in the sense that the applications 142 requesting the resources 144 are built to incorporate resources provided in the same human language in which the resources were originally authored. In other scenarios, the resources may be localized, in cases in which the applications 142 are built for languages other than the languages which the resources were originally authored.

To promote clarity, FIG. 1 illustrates the resource management service 114 and the resource repository 116 separate from the representations of the systems 102, 118, and 134. However, it is noted that at least portions of the resource management service and the resource repository may reside in any of the systems, or in other systems not shown in FIG. 1. More specifically, the resource management service and resource repository may reside in suitable computer-readable storage media within such systems, and the resource management service may be executed in connection with suitable processors within these systems.

Having described the overall operating environments and systems 100 shown in FIG. 1, the discussion now proceeds to a more detailed description of components and process flows related to the resource management service and resource repository. This discussion is now presented with FIG. 2.

Figure 2:
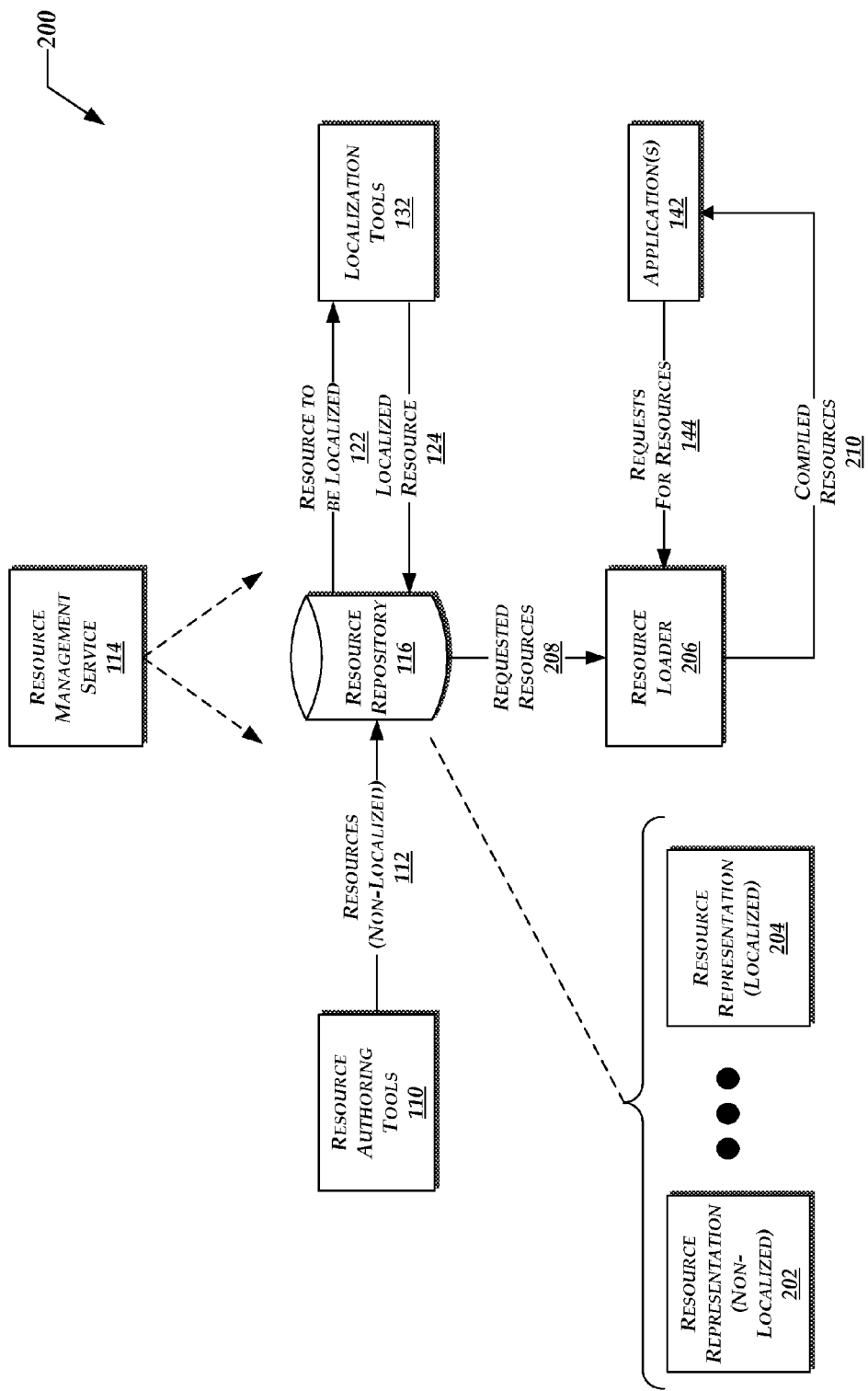
FIG. 2 is a combined block and flow diagram illustrating components and data flows related to the resource management service.

FIG. 2 illustrates components and data flows, denoted generally at 200, related to the resource management service. To facilitate description, but not to limit possible implementations, FIG. 2 may carry forward some drawing elements from previous figures, and denote them with identical reference numbers. For example, FIG. 2 carries forward an example resource management service at 114 and an example resource repository at 116. In addition, FIG. 2 carries forward the resource authoring tools 110, as well as examples of non-localized resources 112 as authored using these tools. FIG. 2 also carries forward the localization tools 132, as well as examples of resources 122 to be localized, and examples of localized resources 124.

Turning to the resource management service 114 more detail, this service may provide an interface between resource authoring tools (e.g., 110) and localization tools (e.g., 132), through a resource repository (e.g., 116). In the example shown in FIG. 2, the resource repository may store the non-localized resources 112 as received from the authoring tools 110. In addition, the resource management service 114 may forward the non-localized resources to the localization tools 132, as denoted at 122. In turn, the localization tools may return corresponding localized resources 124 to the resource repository, which may store those localized resources and associate them with the previously-stored non-localized resources. The resource management service 114 may repeat this general processing to store and localize any number of new or modified resources over time.

As described in further detail below, the resource repository 116 may employ a unified format to store and maintain representations of a variety of resources, whether these resources are localized or not. More specifically, the resource repository 116 may store these resources using suitable representations defined according to this unified format. In general, FIG. 2 illustrates at 202 an example resource representation for a non-localized resource, and illustrates at 204 an example resource representation for a localized resource.

A resource loader 206 may provide an interface between the resource repository 116 and one or more applications (e.g., 142) that may request localized or non-localized resources from the repository. FIG. 2 carries forward at 144 examples of such requests for resources. In response to such requests, the loader 206 may obtain the requested resources from the resource repository, as denoted at 208. For example, the resources 208 as obtained by the resource loader may be in a compiled or binary form, suitable for use by and incorporation into the requesting applications. In non-limiting implementations, these resources may be .dll files. FIG. 2 denotes at 210 the binary or compiled resources as provided to the applications, whether these resources are localized or not.

Having described the components and data flows related to the resource management service 114 and the resource repository 116 in FIG. 2, the discussion proceeds to a description of formats or data structures for storing representations of resources. This description is now provided with FIG. 3.

Figure 3:
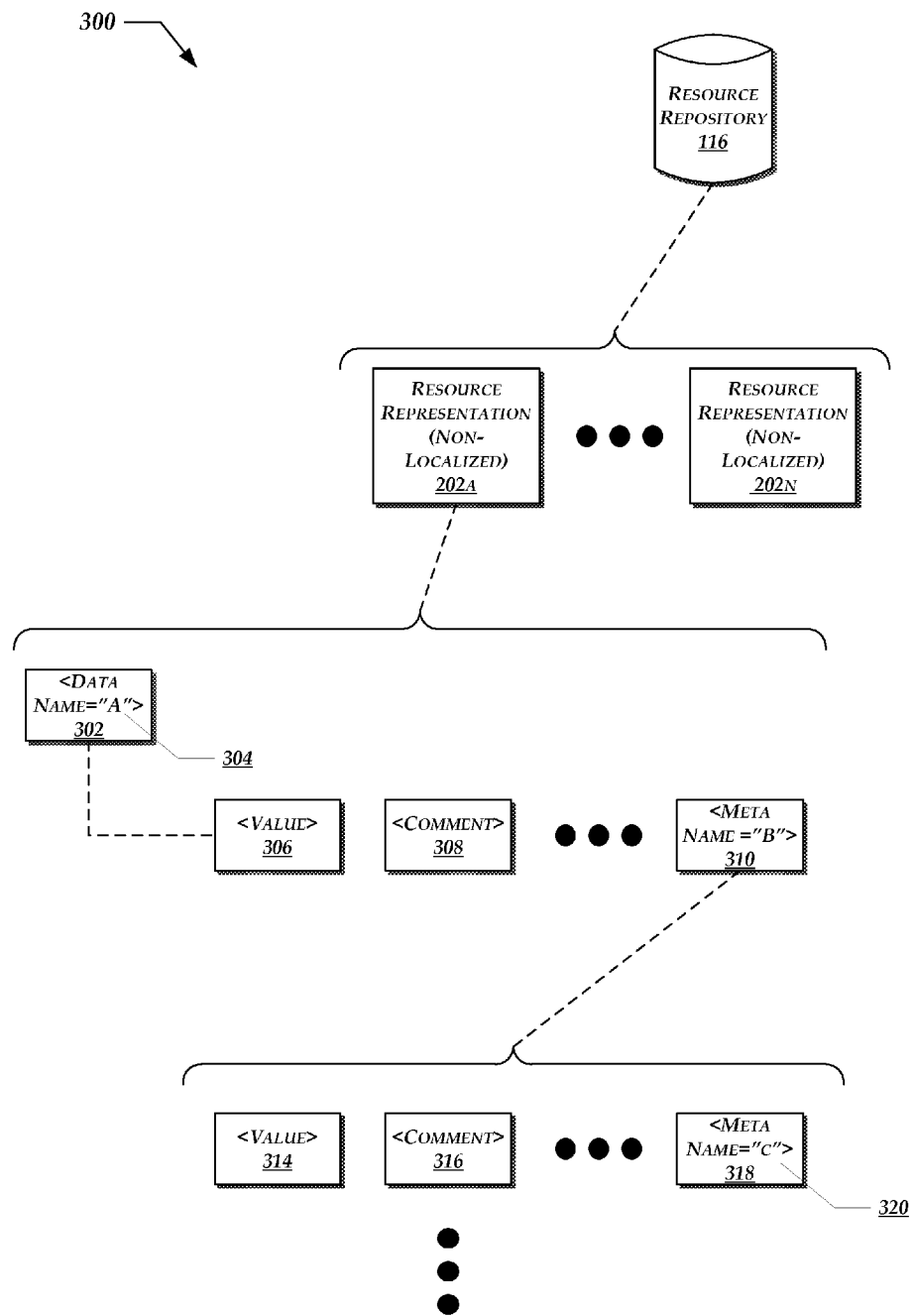
FIG. 3 is a block diagram illustrating formats and data structures for storing representations of resources.

FIG. 3 illustrates formats and data structures, denoted generally at 300, for storing representations of resources. To facilitate description, but not to limit possible implementations, FIG. 3 may carry forward some drawing elements from previous figures, and denote them with identical reference numbers. For example, FIG. 3 carries forward an example resource repository at 116.

The resources stored in the resource repository may be non-localized or localized, in different possible scenarios. For example only, FIG. 3 carries forward representations of non-localized resources, denoted at 202a and 202n. However, it is noted that the repository 116 may include any number of non-localized resources 202, as well as localized resources (e.g., 210 in FIG. 2, but omitted from FIG. 3 for clarity).

Turning to the resource representations in more detail, examples of these resource representations are presented in XML, although other implementations are also possible. Elaborating on the representation 202a as an example, these resource representations may include XML <data> tags 302, which in turn may contain triplets including XML <name> attributes 304 (e.g., "A"), XML <value> tags 306, and XML <comment> tags 308. The <data> tags 302 may be recursive in nature, as illustrated and described in further detail later in FIG. 4. For example, the <data> tags may contain any number of additional <data> tags, which in turn may contain any number of additional <data> tags, and so on.

The representation may also include an XML <meta> tag 310. In addition to the <data> tag described above, the <meta> tag may also provide a generic mechanism for extending the representations of resources, to incorporate arbitrary levels of nesting and/or structure. In general, a <data> tag may contain any number of <data> tags and <meta> tags. In example implementations, a <meta> tag may contain any number of <meta> tags, but no <data> tags. The following XML example illustrates this scenario, omitting <value> and <comment> tags for brevity:

```
<data name="a">
    <data name="b">
        <meta name="f"/>
    </data>
    <data name="c">
        <data name="d"/>
    </data>
    <meta name="a">
        <meta name="b"/>
    </meta>
</data>
```

The content of the <data> tag may also indicate that the tag <value> is a string, or may be replaced with any other XML tag, thereby representing the value of <data> in any way. In some implementations, but not necessarily all, this value may be defined with a schema. In addition, values in the <value> and <comment> tags may contain Unicode (e.g., character) values that may not be supported in the XML specification. In such scenarios, such Unicode values may be encoded using any number of suitable techniques, such as representing a Unicode value using uXXXX, where XXXX is the hexadecimal value of the Unicode character.

In this manner, the representations 202 may provide a unified or uniform extensible format for representing resources used by a variety of different software products and/or applications. The representations may incorporate resources having arbitrary levels of structure or complexity.

In contrast to previous approaches using flat file formats, the unified or uniform format described herein may represent resources having arbitrary complexity or structure within the format itself, without involving changes to any underlying schema or protocol used to define or manipulate the resources. More generally, the unified resource formats described herein may represent data at an arbitrary complexity using the example tags or attributes described herein (e.g., <data>, <name>, <value>, <comment>, <meta>)

In addition, the <meta> tag 310 may enable recursive nesting of the <name>, <value>, and <comment> triplets. In the example shown in FIG. 3, the <meta> tag 310 may be associated with further instances of an XML <name> attribute 312 (e.g., "B"), an XML <value> tag 314, and an XML <comment> tag 316. The <data> tag and/or the <name> attribute thereof may be unique identifiers that serve as indices for a particular resource. The <value> tag may typically be a string or other suitable data constituting the resource. The <comment> tag is optional, and provides an area for developers to insert ancillary descriptions or commentary relating to particular resources. Generally, the descriptions herein of the <comment> and <value> tags apply equally to scenarios in which these tags occur within a <data> tag or a <meta> tag.

In some cases, an additional XML <meta> tag 318 may provide an additional layer or level of recursive nesting. In such scenarios, the <meta> tag 318 may recursively contain one or more <name>, <value>, <comment> triplets, including a <name> attribute 320 (e.g., "C").

The following XML provides a non-limiting example of an XML <data> tag 302, as illustrated in block form in FIG. 3:

```
<data name="idsErrorFileNotFound">
  <value>File not found</value>
  <comment>File does not appear to exist</comment>
  <meta name="locver">
    <value>{Maxlength=256}</value>
    <comment>
      Strings can at most be 256 characters long.
    </comment>
  </meta>
  <meta name="lookupByName">
    <value>True</value>
  </meta>
</data>
```

In this example, the <data> tag defines a resource for an error message indicating that a given file is not found. The <data> tag defines a name "idsErrorFileNotFound", and the first <meta> tag provides instructions for localizing this error message, as indicated in the <value> tag recursively nested under the <meta> tag . In this example, these localization instructions specify a maximum length of 256 characters for this string resource. The second <meta> tag establishes a "True" value for an element having a <name> attribute of "lookupByName".

Having described the data structures shown in FIG. 3, the discussion now turns to a description of additional data structures, for grouping or associating different elements with one another. This discussion is now provided with FIG. 4.

Figure 4:
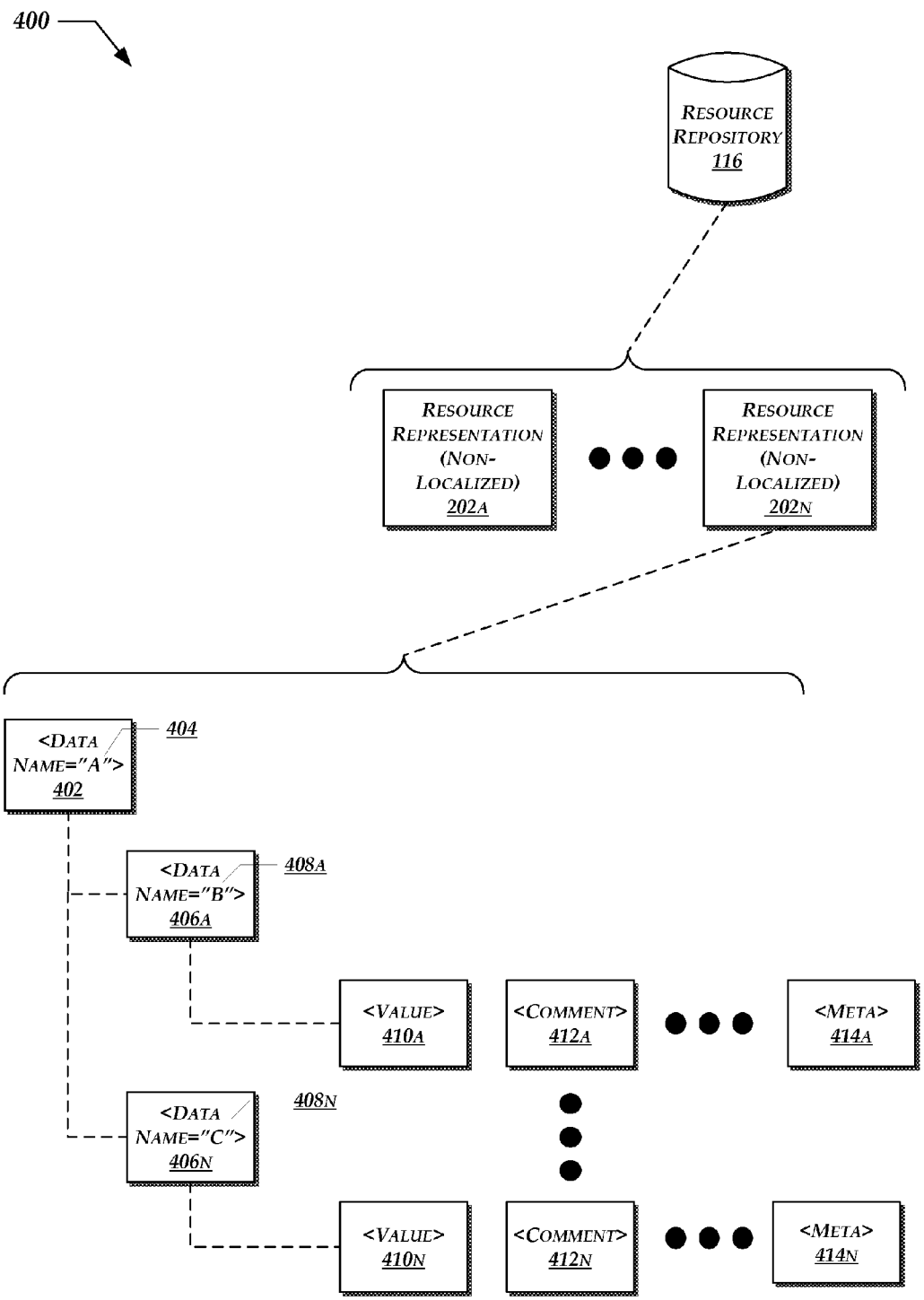
FIG. 4 is a block diagram illustrating formats and data structures for grouping or associating representations of resources with one another.

FIG. 4 illustrates formats and data structures, denoted generally at 400, for grouping or associating representations of resources with one another. To facilitate description, but not to limit possible implementations, FIG. 4 may carry forward some drawing elements from previous figures, and denote them with identical reference numbers. For example, FIG. 4 carries forward an example resource repository at 116, and example representations of resources at 202a and 202n.

Turning to FIG. 4 in more detail, elaborating on the example resource representation 202n, this representation may include an XML <data> tag 402. In general, <data> tags (e.g., 402) may be associated with one <name> attribute, one <value> tag, one <comment> tag, and any number of <meta> tags. However, as described above, a <data> tag may contain one or more additional <data> tags, which in turn may contain respective instances of a <value> tag, a <comment> tag, and any number of <meta> tags.

In the example shown in FIG. 4, the <data> tag 402 has a <name> attribute "A" as denoted at 404. In addition, the <data> tag 402 contains two or more <data> tags, which are denoted at 406a and 406n. The <data> tag 406a contains a <name> attribute 408a (e.g., "B"), and the <data> tag 406n contains a <name> attribute 408n (e.g., "C").

Turning to the <data> tag 406a in more detail, it may include a <value> tag 410a and a <comment> tag 412a. In addition, the <data> tag 406a may contain any number of <meta> tags 414a. Although not illustrated in FIG. 4, as described above, the <meta> tag 414a may provide a recursive mechanism for extending the representation 202n to accommodate arbitrary levels of complexity and structure in resources, as shown in FIG. 3.

Turning to the <data> tag 406n in more detail, it may contain a <value> tag 410n, a <comment> tag 412n, and any number of <meta> tags 414n. Generally, the description of the <data> tag 406a applies equally to the <data> tag 406n.

In general, the <data> tag 402 may group or associate the contained <data> tags 406a (e.g., having <name> attribute "B") and 406n (e.g., having <name> attribute "C") with one another. For example, the XML <data> tag 402 may represent a resource that defines several text strings to be displayed in a given dialog box. In turn, the <name> attribute 408a may define a first text string displayed in the dialog box, while the <name> attribute 408n may define a second text string displayed within the dialog box. The following XML code provides an example of this scenario:

```
<data name="ConfirmationDialogStrings">
  <data name="ConfirmationDialogOK">
    <value>OK</value>
  </data>
  <data name="ConfirmationDialogCancel">
    <value>Cancel</value>
  </data>
</data>
```

It is also noted that the arrangements shown in FIG. 4 may be combined with the arrangements shown in FIG. 3. For example, one of the meta tags 414a or 414n may operate similarly to the meta tags (e.g., 310 or 318) in FIG. 3. More specifically, these meta tags 414a or 414n may provide a recursive nesting mechanism for associating further instances of <name> attributes (e.g., 408), <value> tags (e.g., 410), <comment> tags (e.g., 412), or <meta> tags (e.g., 414).

Having provided the above examples of grouping resources, it is noted that these unified formats may be extended to other applications for grouping, classifying, or classifying resources. In this manner, the unified formats may represent or specify resources across a variety of different software products or applications, while using a common schema. In addition, these unified formats may support specification and processing of localization instructions applicable to these resources, in a human-readable format readily understandable by programmers and developers. These unified formats may also represent a variety of resources available across a variety of applications, and may facilitate moving these resources across files, applications, and products. For example, different resources may be associated with respective unique identifiers defined across such files, applications, and/or products. In addition, these resources may be associated with localization data, which may also migrate across these files, applications, and/or products with the resources.

Having described the data structures shown in FIGS. 3 and 4, the discussion now turns to a description of illustrative process and data flows related to unified formats for resources and repositories for managing localization. This discussion is now presented with FIG. 5.

Figure 5:
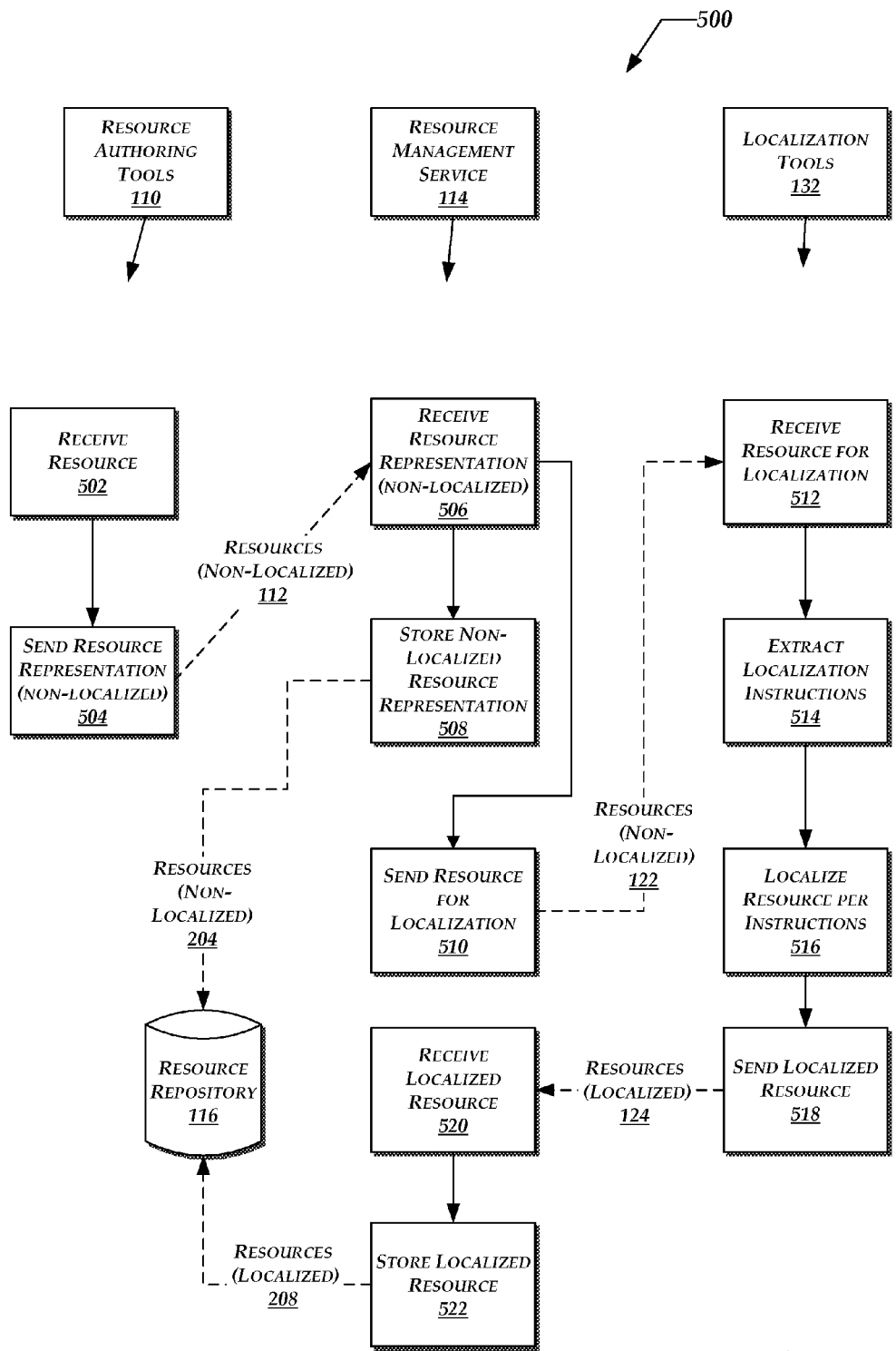
FIG. 5 is a flow chart illustrating process and data flows for unified formats for resources and repositories for managing localization.

FIG. 5 illustrates process and data flows, denoted generally at 500, for unified formats for resources and repositories for managing localization. To facilitate description, but not to limit possible implementations, FIG. 5 may carry forward some drawing elements from previous figures, and denote them with identical reference numbers. For example, FIG. 5 carries forward an example an example resource repository at 116. In addition, FIG. 5 carries forward examples of resource authoring tools 110, resource management service 114, and localization tools 132. For ease of description only, but not to limit possible implementations, FIG. 5 associates certain processing with the authoring tools, the resource management service, or the localization tools to illustrate example operational scenarios. However, it is noted that other components may perform at least parts of the data and/or process flows illustrated in FIG. 5 without departing from the scope and spirit of this description.

Turning to FIG. 5 in more detail, more specifically the resource authoring tools 110, block 502 generally represents receiving one or more given resources. For example, block 502 may include receiving representations of the resources, as provided by a programmer or software developer when formulating a given resource. The above description provides several examples of XML, but other programming languages may be appropriate in different environments as well. Block 502 may include receiving one or more representations of non-localized resources, as provided in suitable programming languages.

In addition, block 502 may, in some instances, include receiving localization instructions applicable to the resources. Examples of localization instructions may include, but are not limited to, those provided in the XML segments above (e.g., maximum permitted string lengths). Other examples of localization instructions may include directives indicating whether or not to localize a given resource.

Block 504 generally represents sending a representation of a non-localized resource for storage in a resource repository. In the example shown in FIG. 5, block 504 may include the resource authoring tools 110 sending the resources, carried forward at 112, to the resource management service.

Turning to the resource management service 114, block 506 represents receiving a representation of a non-localized resource. In turn, block 508 generally represents storing the non-localized resource in, for example, the resource repository 116. FIG. 5 carries forward at 204 the non-localized resources as stored in the repository. In addition, block 510 generally represents sending the non-localized resource for localization. In the example shown, the resource management service may send the non-localized resource (e.g., carried forward as 122) to the localization tools 132.

Turning to the localization tools, block 512 generally represents receiving the non-localized resource for localization. In turn, block 514 represents extracting any localization instructions specified in the representation of the non-localized resource. Assuming an XML implementation, block 514 may include referring to <meta> tags, as well as <name> attributes and <value> tags recursively associated with the <meta> tags, to identify any particular localization instructions specified for the resource.

Block 516 generally represents localizing the resource in response to or in accordance with any localization instructions or restrictions extracted in block 514. For example, in different scenarios, live personnel may manually translate or localize a resource string, apart from or in connection with automated or machine translation processes. In whichever scenario, block 516 may represent receiving the results or outputs of such translation or localization, performed in response to any applicable localization instructions. If no localization instructions are specified for a given resource, block 516 may represent receiving the results of a default localization process.

Block 518 generally represents sending the localized resource for storage in the resource repository. For example only, FIG. 5 carries forward at 124 a representation of the localized resources as provided to the resource management service.

At the resource management service, block 520 generally represents receiving the localized resource. In turn, block 522 represents storing the localized resource in the resource repository. FIG. 5 carries forward at 208 an example of the localized resources as stored in the resource repository 116.

For clarity of illustration only, FIG. 5 illustrates one iteration of processing a given representation of a resource. However, it is noted that the processes and data flows shown in FIG. 5 may be repeated as appropriate to process any number of representations of resources Having provided the preceding description, several observations are now noted. To facilitate description, some of the drawing figures illustrate data and/or process flows represented by unidirectional arrows. However, it is noted that these unidirectional representations do not exclude implementations having bidirectional data and/or process flows. In addition, certain processes and/or data flows are shown herein in particular orders chosen only for convenience and description, but not to limit possible implementations Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the following claims.

What is claimed is:

1. A computer-implemented method comprising performing computer-implemented operations for:

receiving a representation of a non-localized resource that represents textual information that is for display in at least one user interface element presented by at least one software application;

storing the representation of the non-localized resource in a unified resource repository, the unified resource repository being for storing a plurality of representations defined according to a unified format that represents a plurality of resources that correspond to the plurality of representations without changing a schema and a protocol used to define or manipulate the plurality of resources, the plurality of resources comprising the non-localized resource and a localized resource, and the plurality of representations including respective data tags that are associated with
  at least one name attribute for identifying the plurality of resources,
  at least one value tag for providing values of the plurality of resources, and
  at least one meta tag for providing a recursive nesting mechanism that associates the name attribute and the value tag with at least a further name attribute and at least a further value tag, wherein the further name attribute identifies at least one instance of localization instructions for the plurality of resources, and wherein the further value tag specifies the localization instructions for the plurality of resources,
wherein the representation of the non-localized resource includes instances of the further name attribute and the further value tag that specify localization instructions for the non-localized resource, and at least one of the respective data tags contains at least a plurality of further data tags comprising respective further name attributes; and
sending the non-localized resource for localization in accordance with the localization instructions specified for the non-localized resource.

2. The computer-implemented method of claim 1, further comprising receiving a localized version of the non-localized resource.

3. The computer-implemented method of claim 2, further comprising storing the localized version in the unified resource repository, and associating the localized version with the non-localized resource.

4. The computer-implemented method of claim 1, further comprising receiving at least a further representation of at least a further non-localized resource, wherein the further representation of the further non-localized resource includes instances of the further name attribute and the further value tag that specify further localization instructions for the further non-localized resource, wherein the further localization instructions are different from the localization instructions.

5. The computer-implemented method of claim 4, further comprising storing the further representation of the further non-localized resource in the unified resource repository.

6. The computer-implemented method of claim 4, further comprising sending the non-localized resource for localization in accordance with the further localization instructions.

7. The computer-implemented method of claim 6, further comprising receiving a further localized version of the further non-localized resource, associating the further localized version with the further non-localized resource, and storing the further localized version in the unified resource repository.

8. The computer-implemented method of claim 1, further comprising providing tools for authoring the resources, and providing tools for localizing the resources.

9. A tangible computer-readable storage medium having computer-executable instructions stored thereon that, when executed by a computer, cause the computer to perform operations comprising:
  receiving a representation of a non-localized resource that represents textual information that is for display in at least one user interface element presented by at least one software application;
  storing the representation of the non-localized resource in a unified resource repository, the unified resource repository being for storing a plurality of representations defined according to a unified format that represents a plurality of resources that correspond to the plurality of representations without changing a schema and a protocol used to define or manipulate the plurality of resources, the plurality of resources comprising the non-localized resource and a localized resource, and the plurality of representations including respective data tags that are associated with
    at least one name attribute for identifying the plurality of resources,
    at least one value tag for providing values of the plurality of resources, and
    at least one meta tag for providing a recursive nesting mechanism that associates the name attribute and the value tag with at least a further name attribute and at least a further value tag, wherein the further name attribute identifies at least one instance of localization instructions for the plurality of resources, and wherein the further value tag specifies the localization instructions for the plurality of resources,
  wherein the representation of the non-localized resource includes instances of the further name attribute and the further value tag that specify localization instructions for the non-localized resource, and at least one of the respective data tags contains at least a plurality of further data tags comprising respective further name attributes; and
  sending the non-localized resource for localization in accordance with the localization instructions specified for the non-localized resource.

10. The tangible computer-readable storage medium of claim 9, further comprising receiving a localized version of the non-localized resource.

11. The tangible computer-readable storage medium of claim 10, further comprising storing the localized version in the unified resource repository, and associating the localized version with the non-localized resource.

12. The tangible computer-readable storage medium of claim 9, further comprising receiving at least a further representation of at least a further non-localized resource, wherein the further representation of the further non-localized resource includes instances of the further name attribute and the further value tag that specify further localization instructions for the further non-localized resource, wherein the further localization instructions are different from the localization instructions.

13. The tangible computer-readable storage medium of claim 12, further comprising storing the further representation of the further non-localized resource in the unified resource repository.

14. The tangible computer-readable storage medium of claim 12, further comprising sending the non-localized resource for localization in accordance with the further localization instructions.

15. The tangible computer-readable storage medium of claim 14, further comprising receiving a further localized version of the further non-localized resource, associating the further localized version with the further non-localized resource, and storing the further localized version in the unified resource repository.

16. The tangible computer-readable storage medium of claim 9, further comprising providing tools for authoring the resources, and providing tools for localizing the resources.

17. A computer system comprising:
  a processor; and
  a memory having computer-executable instructions stored thereon that, when executed by a computer, cause the computer to perform operations comprising receiving a representation of a non-localized resource that represents textual information that is for display in at least one user interface element presented by at least one software application, storing the representation of the non-localized resource in a unified resource repository, the unified resource repository being for storing a plurality of representations defined according to a unified format that represents a plurality of resources that correspond to the plurality of representations without changing a schema and a protocol used to define or manipulate the plurality of resources, the plurality of resources comprising the non-localized resource and a localized resource, and the plurality of representations including respective data tags that are associated with at least one name attribute for identifying the plurality of resources, at least one value tag for providing values of the plurality of resources, and at least one meta tag for providing a recursive nesting mechanism that associates the name attribute and the value tag with at least a further name attribute and at least a further value tag, wherein the further name attribute identifies at least one instance of localization instructions for the plurality of resources, and wherein the further value tag specifies the localization instructions for the plurality of resources, wherein the representation of the non-localized resource includes instances of the further name attribute and the further value tag that specify localization instructions for the non-localized resource, and at least one of the respective data tags contains at least a plurality of further data tags comprising respective further name attributes, and sending the non-localized resource for localization in accordance with the localization instructions specified for the non-localized resource.

18. The system of claim 17, wherein the operations further comprise receiving a localized version of the non-localized resource, storing the localized version in the unified resource repository, and associating the localized version with the non-localized resource.

19. The system of claim 17, wherein the operations further comprise receiving at least a further representation of at least a further non-localized resource, wherein the further representation of the further non-localized resource includes instances of the further name attribute and the further value tag that specify further localization instructions for the further non-localized resource, wherein the further localization instructions are different from the localization instructions.

20. The system of claim 19, wherein the operations further comprise sending the non-localized resource for localization in accordance with the further localization instructions, and receiving a further localized version of the further non-localized resource, associating the further localized version with the further non-localized resource, and storing the further localized version in the unified resource repository.

* * * * *